United States Patent
Plewa

(10) Patent No.: US 12,352,378 B2
(45) Date of Patent: Jul. 8, 2025

(54) EXPANSION PLUG AND SYSTEM AND METHOD EMPLOYING SAME

(71) Applicant: Robert Plewa, East Aurora, NY (US)

(72) Inventor: Robert Plewa, East Aurora, NY (US)

( * ) Notice: Subject to any disclaimer, the term of this patent is extended or adjusted under 35 U.S.C. 154(b) by 305 days.

(21) Appl. No.: 18/180,223

(22) Filed: Mar. 8, 2023

(65) Prior Publication Data
US 2024/0301982 A1   Sep. 12, 2024

(51) Int. Cl.
| | |
|---|---|
| *F16L 55/132* | (2006.01) |
| *F16L 41/06* | (2006.01) |
| *F16L 41/16* | (2006.01) |
| *F16L 55/11* | (2006.01) |
| *F16L 55/16* | (2006.01) |

(52) U.S. Cl.
CPC ........... *F16L 55/132* (2013.01); *F16L 41/065* (2013.01); *F16L 41/16* (2013.01); *F16L 55/1612* (2013.01); *F16L 55/1108* (2013.01); *F16L 55/1141* (2013.01)

(58) Field of Classification Search
CPC . F16L 55/132; F16L 55/1612; F16L 55/1108; F16L 55/1141; F16L 41/16; F16L 41/065
See application file for complete search history.

(56) References Cited

U.S. PATENT DOCUMENTS

| | | | | |
|---|---|---|---|---|
| 987,145 A | * | 3/1911 | Leisinger | F16L 55/132 220/235 |
| 1,616,392 A | * | 2/1927 | Provost | F16L 55/132 138/90 |
| 2,708,588 A | * | 5/1955 | Prah | F16L 55/132 251/149.6 |
| 4,127,141 A | * | 11/1978 | Ledonne | F16L 55/124 137/321 |
| 4,239,055 A | * | 12/1980 | Van Coffman | F16K 43/00 137/315.42 |
| 4,310,029 A | * | 1/1982 | Dudek | F16L 55/132 215/360 |
| 5,099,868 A | * | 3/1992 | Weber | F16L 55/124 138/97 |
| 5,511,578 A | * | 4/1996 | Wagner | F16L 55/124 137/315.42 |
| 5,592,965 A | * | 1/1997 | Rakieski | F16L 55/132 29/213.1 |
| 6,035,898 A | * | 3/2000 | Dominguez | F16L 55/132 138/90 |
| 6,883,546 B1 | * | 4/2005 | Kobylinski | F16L 55/132 215/273 |
| 7,546,847 B2 | * | 6/2009 | Morrison | F16L 55/1604 137/317 |

(Continued)

*Primary Examiner* — William M McCalister
(74) *Attorney, Agent, or Firm* — BUCHANAN, INGERSOLL & ROONEY PC

(57) ABSTRACT

An expansion plug includes a first collar configured to advance as it rotates relative to a shaft, a second collar configured to move axially along the shaft without rotating, a first expanding structure, and a second expanding structure disposed in the stated order on the shaft. When the first collar is rotated in an advancement direction, opposite sides of the second expanding structure are moved closer together to expand the second expanding structure, and then opposite sides of the first expanding structure are moved closer together to expand the first expanding structure.

20 Claims, 8 Drawing Sheets

(56) References Cited

U.S. PATENT DOCUMENTS

| | | | | |
|---|---|---|---|---|
| 7,665,481 | B2* | 2/2010 | Mazur | F16L 55/132 137/271 |
| 8,037,904 | B2* | 10/2011 | Carnevali | F16L 55/132 220/236 |
| 8,281,818 | B1* | 10/2012 | Vazquez | F16L 55/132 138/90 |
| 9,664,588 | B2* | 5/2017 | Kotlyar | F16L 55/1283 |
| 9,982,826 | B1* | 5/2018 | Schuster | E03F 3/04 |
| 11,346,488 | B1* | 5/2022 | Walls | F16L 55/1683 |
| 2004/0221980 | A1* | 11/2004 | Sidener | F16L 55/132 164/113 |
| 2008/0066820 | A1* | 3/2008 | Williams | F16L 55/1141 138/91 |
| 2008/0075538 | A1* | 3/2008 | Crane | F16L 55/128 405/184.3 |
| 2008/0092970 | A1* | 4/2008 | Carnevali | F16L 55/132 138/90 |
| 2013/0098473 | A1* | 4/2013 | Wassil, Jr. | F16L 41/04 137/315.42 |
| 2016/0018042 | A1* | 1/2016 | Bair | F16L 55/1141 138/89 |
| 2017/0052086 | A1* | 2/2017 | Sarkissian | G01M 3/022 |
| 2017/0291743 | A1* | 10/2017 | Kobylinski | F16L 55/1141 |

* cited by examiner

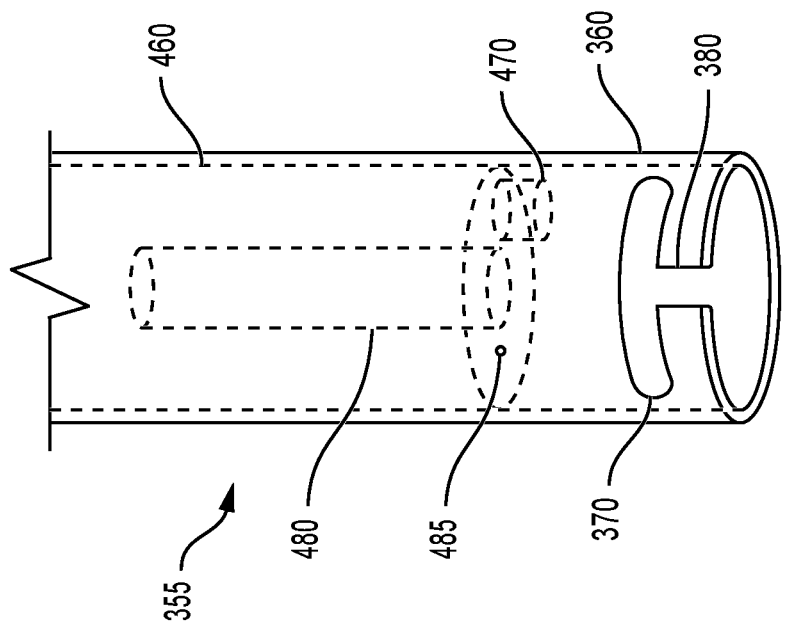
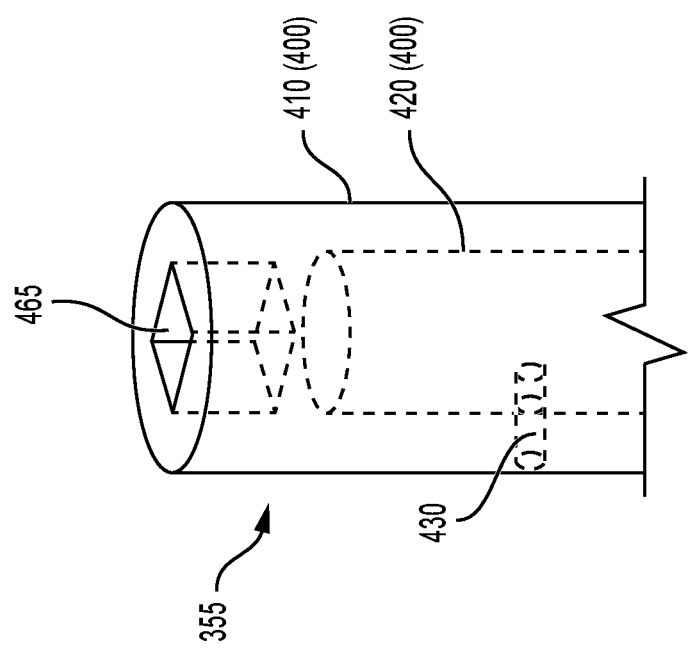

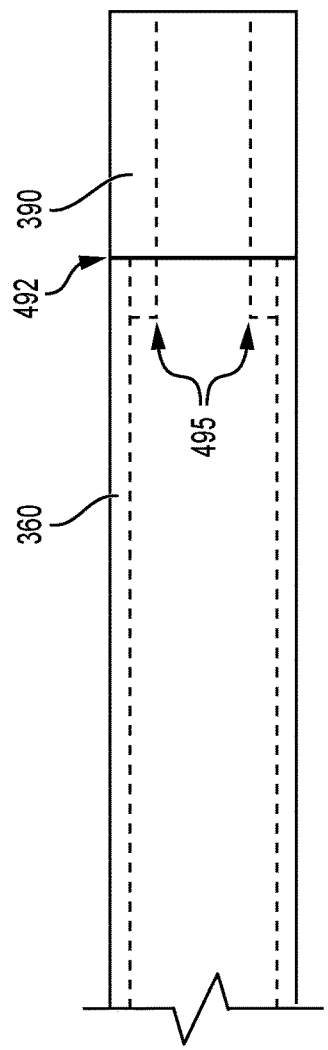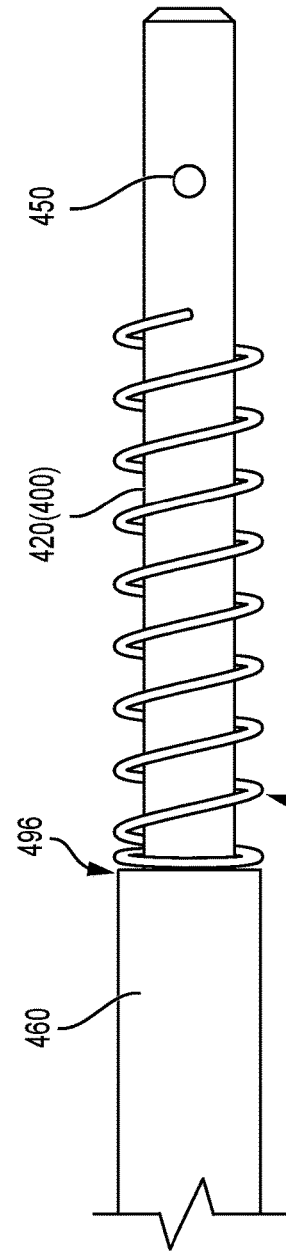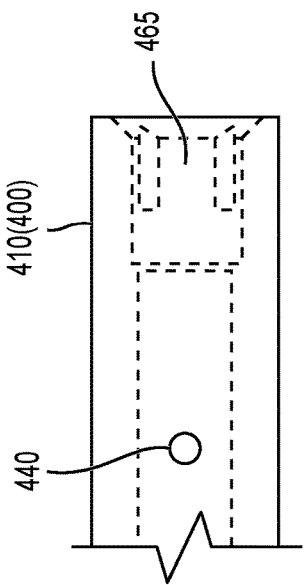

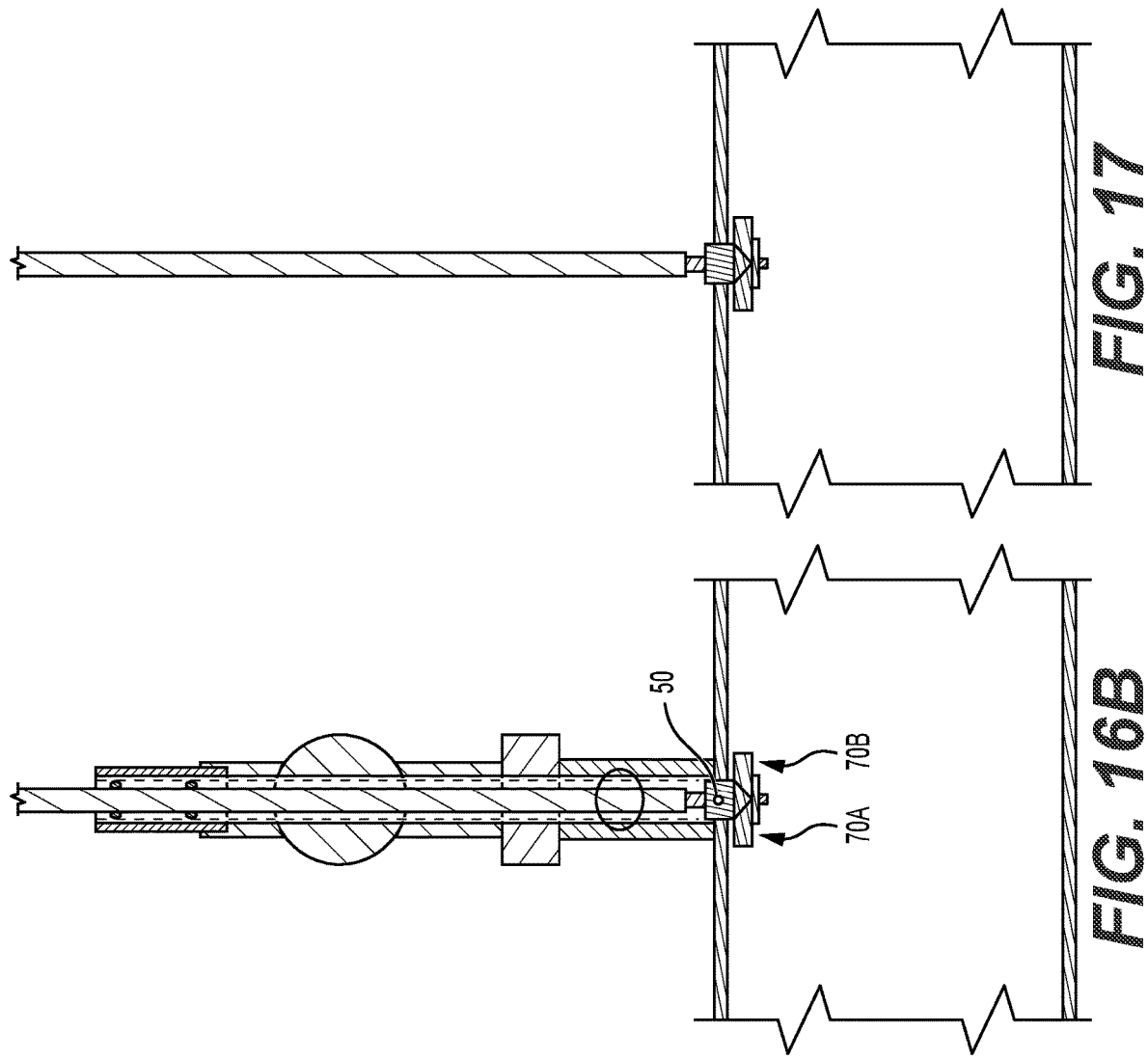
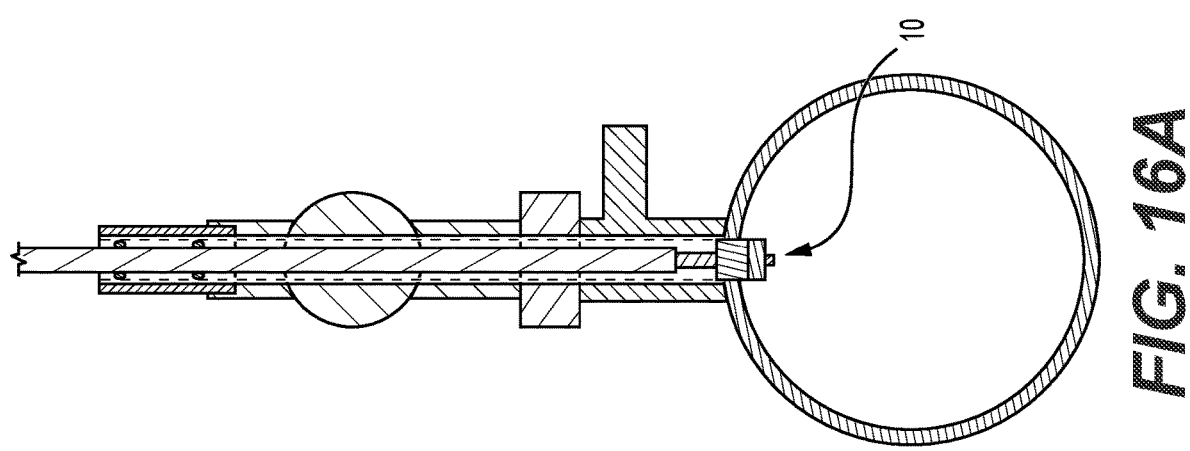

EXPANSION PLUG AND SYSTEM AND METHOD EMPLOYING SAME

FIELD OF THE INVENTION

The present invention relates generally to an expansion plug, and to a system and method for sealing a transverse hole in a pipe using the expansion plug.

BACKGROUND

Pressurized piping is commonly used to transport a fluid to an end use location. In natural gas applications, large pipes known as gas mains are used, along with connection joints, referred to in the industry as service tees, installed periodically along the gas main at transverse holes created in the gas main. Such service tees include a first pipe that extends at a right angle from the gas main, and a second pipe that extends from the first pipe and supplies the gas to the end use location, such as a residential home. The first, bottom end of the first pipe is in communication with the transverse hole, and the second, top end of the first pipe is typically closed by a plug and capped off. Furthermore, when a service tee is put out of service, the second pipe can be closed off as well.

A common method of attaching the service tee to the gas main is by using a clamping structure. Service tees that use such a clamping structure are known in the industry as a tapping saddle. The bottom end of the first pipe in such tapping saddles is provided with a top clamp half which is configured to overlie a portion of the outer surface of the main on its top side, and to be bolted to a corresponding bottom clamp half that overlies a corresponding portion of the outer surface of the main on its bottom side.

Ideally, an installed tapping saddle or other type of service tee will function properly for a long time without leaking. However, service tees can be installed incorrectly or tampered with by a third party, or there can be manufacturing defects due, for example, to bad material batches, resulting in the need for early replacement. Furthermore, adverse weather conditions such as frost heave cycles can contribute to leaks in service tees.

Conventionally, when a tapping saddle or other type of service tee needs to be replaced, the replacement is done at least partially "on the fly". In other words, once the service tee is removed, natural gas can exit the transverse hole in the main, until the new service tee is installed. This can cause dangerous conditions, for example, if the replacement service tee is made of plastic, static electricity generated thereby could ignite the natural gas escaping from the main. Alternatively, the gas flow in the main can be shut down during the replacement, but such a technique is not ideal either, due, for example, to the potential for inconveniencing other customers. Thus, a need exists for a system and method for replacing a tapping saddle or other type of service tee in which the natural gas is prevented from escaping from the transverse hole in the main during the entire operation without shutting down the entire gas flow.

SUMMARY

An expansion plug includes a shaft having a head on a distal end thereof and a shank, the head having an outer diameter larger than an outer diameter of the shank, the shank having a threaded outer surface, a first collar having a threaded hole engaged to the threaded outer surface of the shank and configured to move along the shank as the collar is rotated relative to the shank, a first expanding structure configured to expand upon opposite sides of the first expanding structure moving closer together, the first expanding structure disposed on the shank distal to the first collar, and a second expanding structure configured to expand upon opposite sides of the second expanding structure moving closer together, the second expanding structure disposed on the shank distal to the first expanding structure. The expansion plug is configured such that, as the first collar is rotated in a direction to advance the first collar toward the head, the opposite sides of the second expanding structure are moved closer together to expand the second expanding structure, and then the opposite sides of the first expanding structure are moved closer together to expand the first expanding structure.

In an embodiment, the first collar includes a first major surface, a second major surface opposite the first major surface and facing the distal end of the shank, and a cavity formed in the first major surface and configured to be engaged by an axial protrusion of an expansion tool.

In an embodiment, the expansion plug further includes a second collar having a radial inward protrusion engaged with an axial slot in the threaded outer surface of the shank to limit rotation of the second collar relative to the shank while allowing the second collar to move along the shank, the second collar disposed on the shank distal to the first collar and proximal to the first expanding structure.

In an embodiment, the first expanding structure includes an elastomeric element having an annular configuration and configured to expand radially when it is compressed axially.

In an embodiment, the second expanding structure includes a wedge having a central opening disposed over the shank, a pair of opposed ears which surround the shank, and a circumferential spring which biases the ears together, wherein the ears are configured to be pushed apart radially as the wedge moves toward the head to press against angled walls of the ears in a direction opposing the bias of the circumferential spring.

A system for sealing a transverse hole in a pipe includes the expansion plug, and an expansion tool configured to rotate the first collar relative to the shank.

A method for sealing a transverse hole in a pipe includes providing the expansion plug and using an expansion tool to rotate the first collar relative to the shank in a first direction so that the expansion plug seals the transverse hole.

BRIEF DESCRIPTION OF THE DRAWINGS

FIGS. 9A and 9B illustrate perspective views of the proximal and distal ends of an expansion tool for use with the FIG. 1 expansion plug.

FIG. 10 illustrates a proximal side of a first component of the expansion tool.

FIG. 11 illustrates a proximal side of a second component of the expansion tool.

FIG. 12 illustrates a third component of the expansion tool.

FIGS. 16A and 16B illustrate a fourth step in a process using the expansion plug and expansion tool.

FIG. 17 illustrates a fifth step in a process using the expansion plug and expansion tool.

DETAILED DESCRIPTION

Figure 1:
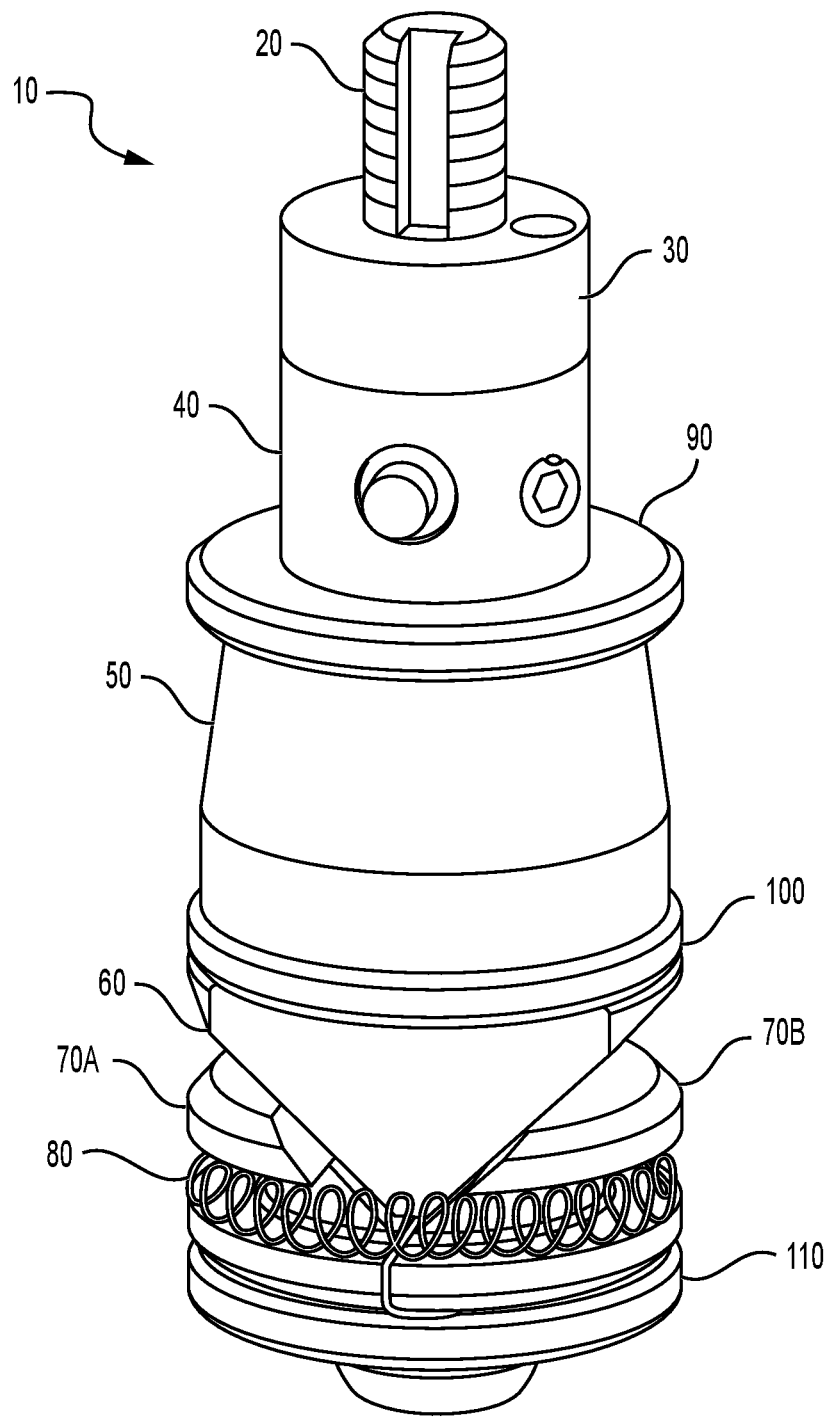
FIG. 1 illustrates a perspective view of an expansion plug according to an embodiment.

Set forth below with reference to the accompanying drawings is a detailed description of embodiments of an expansion plug and a system and method employing same.

An expansion plug 10 according to the present disclosure includes a shaft 20, a first collar 30, a second collar 40, a first expanding structure/elastomeric element 50, a second expanding structure including a wedge 60, a pair of ears 70 (i.e., left ear 70A and right ear 70B), a circumferential spring 80, a first washer 90 disposed between the second collar 40 and the first expanding structure, a second washer 100 disposed between the first expanding structure and the second expanding structure, and a third washer 110 disposed between the second expanding structure and a head 120 of the shaft 20.

Figure 2:
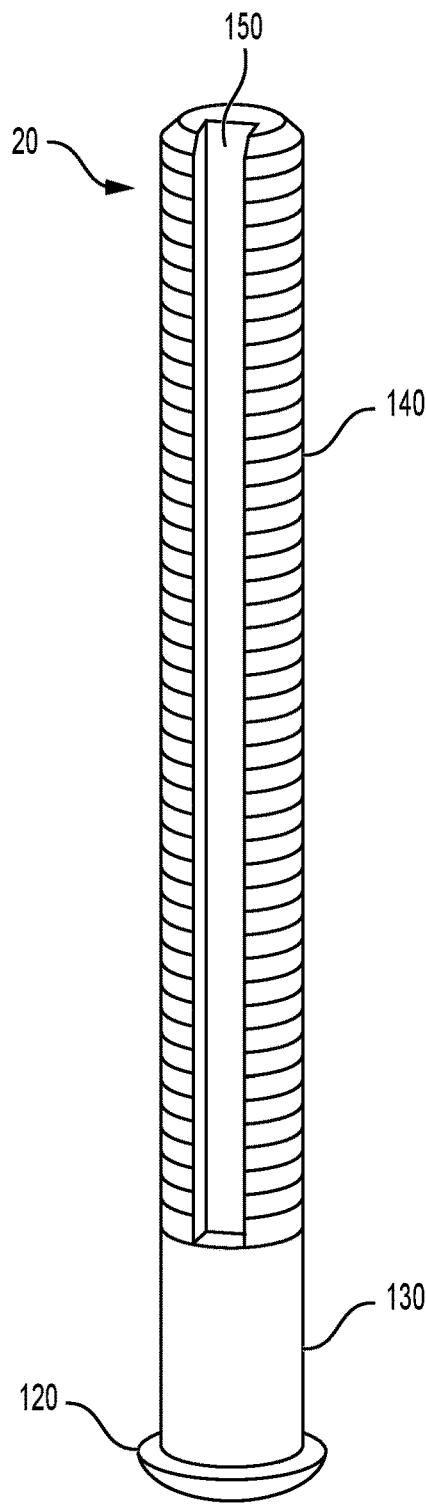
FIG. 2 illustrates a perspective view of a shaft of the FIG. 1 expansion plug.
Figure 3A:
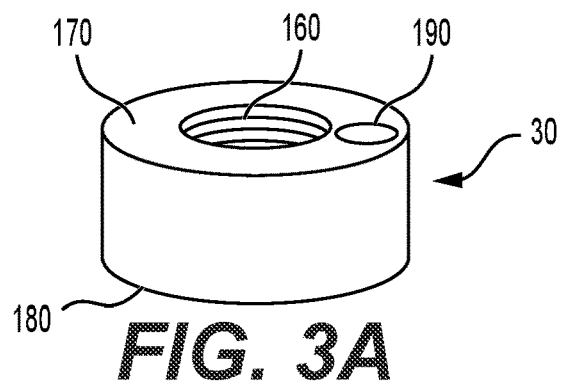
FIGS. 3A and 3B illustrate a perspective view and a top view, respectively, of a first collar of the FIG. 1 expansion plug.
Figure 3B:
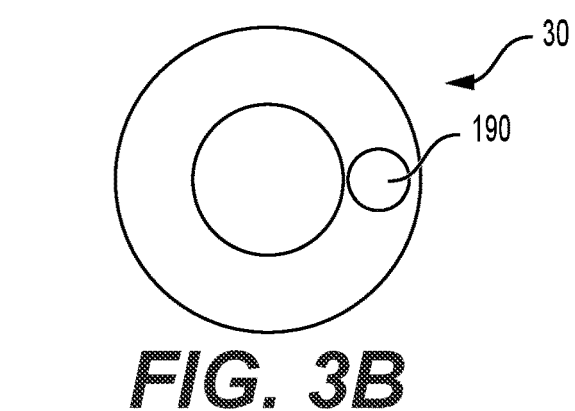

As illustrated in FIG. 2, the shaft 20 includes the head 120 at its distal end, and a shank 130, with the head 120 having an outer diameter larger than an outer diameter of the shank 130. The shank 130 has a threaded outer surface portion 140 along the majority of its length, starting from its proximal end, with an axial slot 150 formed in the threaded outer surface portion 140. As illustrated in FIGS. 3A and 3B, the first collar 30 has an annular shape defining a threaded hole 160. The threaded hole 160 is configured to engage with, i.e., screw onto, the threaded outer surface portion 140 of the shank 130, so that the first collar 30 will move along the shank 130 as it is rotated relative to the shank 130.

The first collar 30 also includes a first major surface 170 and a second major surface 180 opposite the first major surface 170. As best seen in FIG. 1, the second major surface 180 faces the head 120 of the shaft 20. Meanwhile, the first major surface 170 has a cavity 190 formed therein, which is configured to be engaged by an axial protrusion 470 of an expansion tool 355, as discussed in detail below.

Figure 4A:
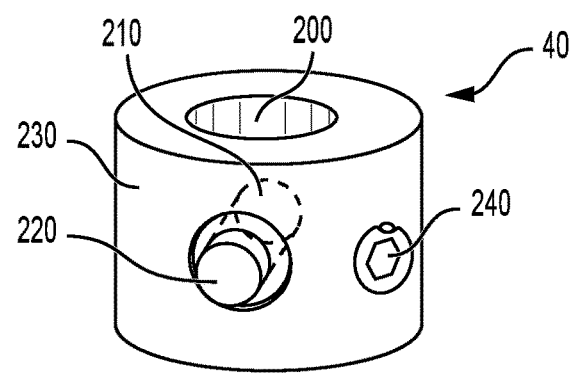
FIGS. 4A and 4B illustrate a perspective view and a top view, respectively, of a second collar of the FIG. 1 expansion plug.
Figure 4B:
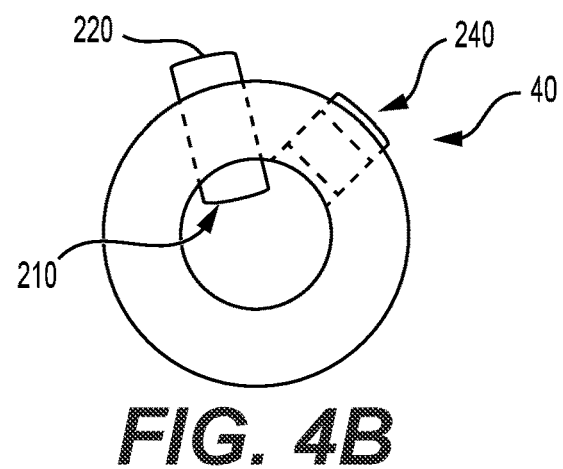

As illustrated in FIGS. 4A and 4B, the second collar 40 also has an annular shape defining a cylindrical through-hole 200. The cylindrical through-hole 200 of the second collar 40 is relatively smooth (i.e., is not threaded), so that it can slide over the threaded outer surface portion 140 of the shank 130 without rotating. Projecting inwardly from the cylindrical wall defining the cylindrical though-hole 200 is a radial inward protrusion 210. The radial inward protrusion 210 is configured to engage with the axial slot 150 to limit or prevent the second collar 40 from rotating relative to the shank 130 as it slides axially along the shank 130. A radial outward protrusion 220 protrudes radially outward from the cylindrical outer surface 230 of the second collar 40, and there is a set screw 240 disposed in a threaded hole in the side wall and adjustable between a position where it also protrudes radially outward from the cylindrical outer surface 230, and a position where it is basically flush with the cylindrical outer surface 230. The radial outward protrusion 220, and the set screw 240 when set to protrude, are both configured to engage with a circumferential slot 370 of an expansion tool 355, as discussed in detail below.

Figure 5:
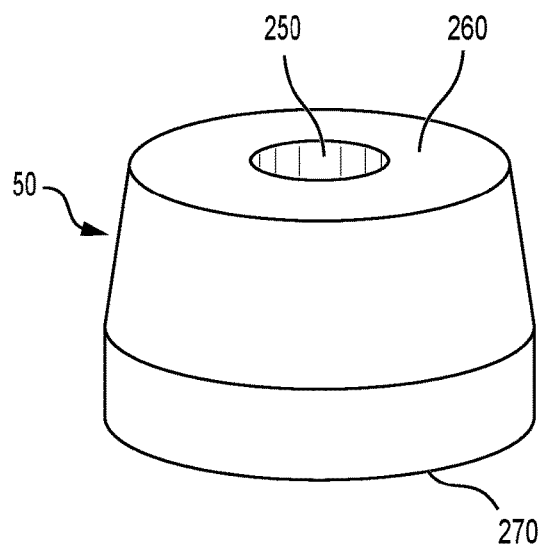
FIG. 5 illustrates a perspective view of an elastomeric element of the FIG. 1 expansion plug.

As illustrated in FIG. 5, the elastomeric element 50 has a generally annular configuration, with a relatively smooth cylindrical through-hole 250 so that it can slide over the threaded outer surface portion 140 of the shank 130 without rotating. As explained in detail below, the elastomeric element 50 is configured to expand radially when it is compressed axially, i.e., when its two major surfaces 260 and 270 are moved closer together.

Figure 6:
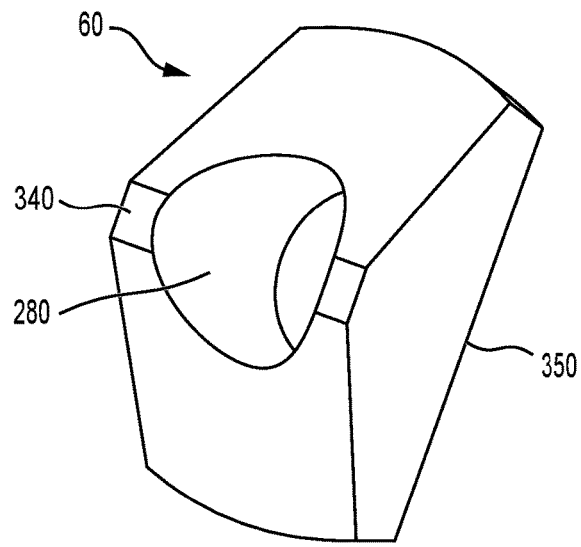
FIG. 6 illustrates a perspective view of a wedge of the FIG. 1 expansion plug.
Figure 7A:
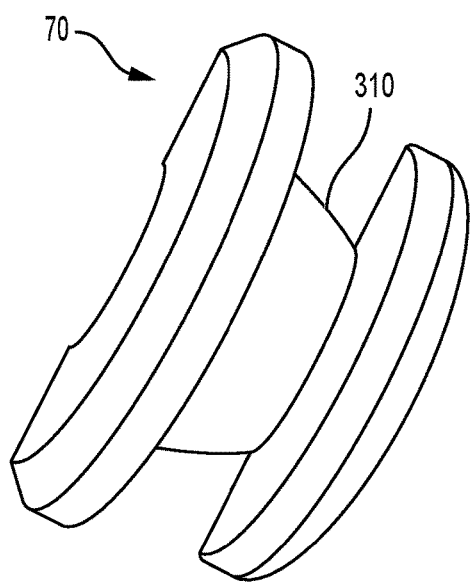
FIGS. 7A and 7B illustrate opposite sides of ears of the FIG. 1 expansion plug.
Figure 7B:
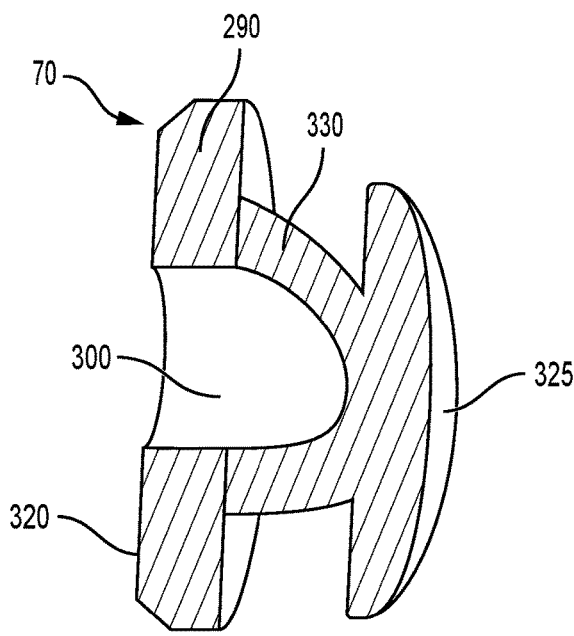

As illustrated in FIG. 6, the wedge 60 has a generally triangular prism shape with a cylindrical through-hole 280 extending along its axis of symmetry, so that it can slide over the threaded outer surface portion 140 of the shank 130 without rotating. As can be seen in FIGS. 7A and 7B, the ears 70, which each have the same configuration, will define a generally annular shape when placed together facing each other (i.e., each have a generally half-annular shape). When the facing surfaces 290 of the ears 70 are placed together, semi-cylindrical cavities 300 together define a central through-hole having substantially the same diameter as that of the through-holes 200, 250, 280, etc. of the other components that are placed over the shank 130. On a side of the ear 70 opposite the facing side (i.e., the side that defines the cylindrical outer surface when the ears are placed together), a circumferential slot 310 is defined, such that when the ears are placed together as discussed, a circular slot is formed, which receives the circumferential spring 80, as illustrated in FIG. 1 and discussed in detail below. Each ear 70 also includes a first major surface 320, a second major surface 325 opposite the first major surface 320, and an angled wall 330 which is formed to extend from the second major surface 325 in a direction toward the cavity 300 and the first major surface 320, terminating at the facing surface 290.

The circumferential spring 80 is configured to hold the ears 70A and 70B when placed in the circular slot defined by the circumferential slots 310. Furthermore, as seen in FIG. 1, the angle defined by the tip 340 of the wedge 60 generally matches the angle formed by the two angled walls 330 of the ears 70A and 70B. As also seen in FIG. 1, the ears 70A and 70B are placed on the shaft 20 with the circumferential spring 80 in the circumferential slots 310, and such that the major surface 320 faces the head 120 of the shaft 20. Further, the wedge 60 is positioned immediately adjacent the ears 70A and 70B on the proximal side thereof such that the tip 340 of the wedge 60 nests against the angled walls 330 of the ears 70A and 70B. The wedge 60, ears 70A and 70B, and circumferential spring 80 thus form a second expanding structure configured to expand upon opposite sides of the second expanding structure (i.e., the major surface 350 of the wedge 60 and the major surfaces 320 of the ears 70A and 70B), because the tip 340 will push the ears 70A and 70B apart. In other words, the circumferential spring 80 biases the ears 70A and 70B together, and the ears 70A and 70B are pushed apart radially as the wedge 60 moves toward the head 120 to press against the angled walls 330 of the ears 70A and 70B in a direction opposing the bias of the circumferential spring 80.

Furthermore, the biasing force of the circumferential spring 80 and the geometry of all of the components of the second expanding structure is such that the compressive force on the major surface 350 of the wedge and the first major surfaces 320 of the ears 70A and 70B required to cause those surfaces to move together and the ears 70A and 70B to move away from each other is relatively low. By comparison, the compressive force on the major surfaces 260 and 270 required to cause it to compress axially and expand radially is relatively high. In other words, as the first collar 30 is rotated in a direction to advance the first collar 30 toward the head 120, the opposite sides of the second expanding structure are moved closer together to expand the second expanding structure, and then the opposite sides of the first expanding structure are moved closer together to expand the first expanding structure.

Figure 8A:
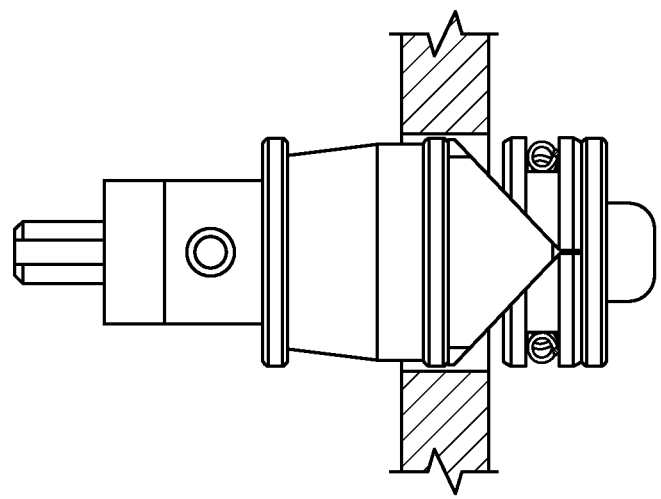
FIGS. 8A, 8B, and 8C illustrate the FIG. 1 expansion plug in an un-expanded state, a partially expanded state, and a fully expanded state, respectively.
Figure 8B:
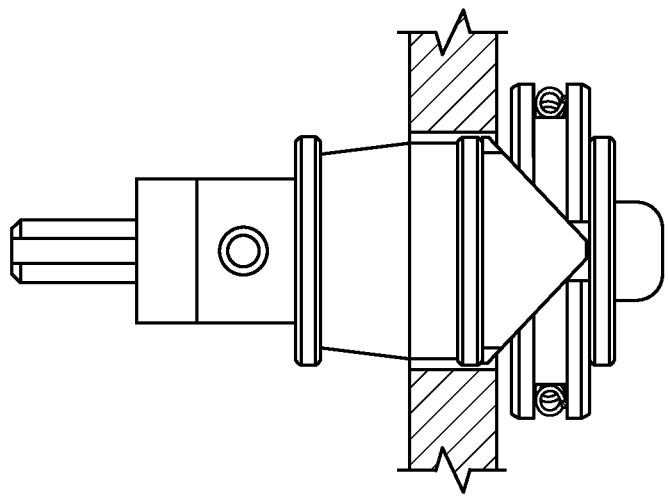
Figure 8C:
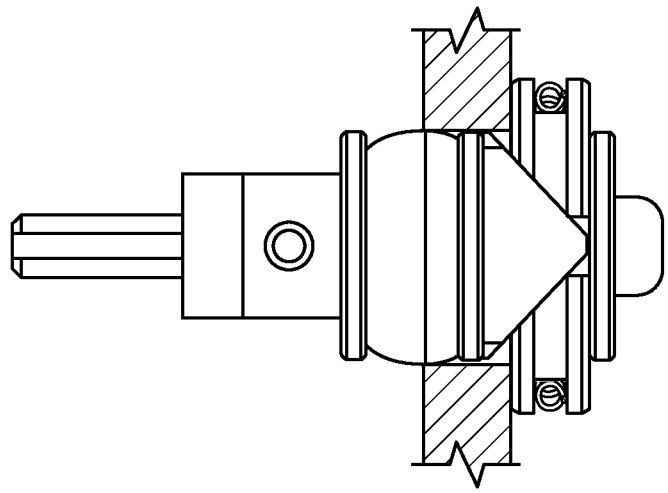

In more detail, as illustrated in FIGS. 8A, 8B, and 8C, the first collar 30, when rotated in the advancing direction from the initial position of FIG. 8A, pushes the second collar 40 in the advancing direction. The second collar 40 does not rotate as it advances due to the present of the radial inward protrusion 210 in the axial slot 150. The advancement of the second collar 40 presses the first washer 90 in the advancement direction. Because the second expanding structure is less stiff than the first expanding structure, as discussed above, the second washer 100 will move toward the third washer 110 before the first washer 90 moves toward the second washer 100. This will cause the wedge 60 to push the ears 70A and 70B apart to the position illustrated in FIG. 8B, at which point the tip of the wedge 60 bears against the third washer 110. Further advancement of the first collar 30 will cause the first washer 90 to move toward the second washer 100 and the first expanding structure to expand, as illustrated in FIG. 8C.

An expansion tool 355 configured to operate the expansion plug from a distance is illustrated in FIGS. 9-12. The expansion tool 355 has a generally elongated cylindrical shape with two relatively moving parts. The first part is a fixed tube 360 having, at its distal end, an axial slot 380 connected to a circumferential slot 370, as illustrated in FIG. 9B. As seen in FIG. 10, the proximal end of the fixed tube 360 has a thicker wall portion 390 with a smaller inner diameter, thus defining a distal-facing shoulder 495, which keeps the movable part from sliding out of the fixed tube 360, as discussed in more detail below. FIG. 10 also illustrates that the fixed tube 360 can be formed as a two-component welded structure, welded at welded connection 492, although this is not necessary.

The expansion tool 355 further includes a rotatable element 400 rotatable relative to the fixed tube 360. The rotatable element 400 can be made of, for example, a first rotatable element portion 410 illustrated partially in FIGS. 9A and 12 and a second rotatable element portion 420 illustrated in whole in FIGS. 9A and 11, which are fixed together by a rivet 430 extending through respective holes 440 and 450 in the first rotatable element portion 410 and the second rotatable element portion 420. In the assembled state, the first rotatable element portion 410 is proximal of the proximal end of the fixed tube 360, which constrains movement of the first rotatable element portion 410 (and thus the rotatable element 400) in the distal direction relative to the fixed tube 360. In the meantime, a larger diameter portion 460 of the of the second rotatable element portion 420 is distal of the thicker wall portion 390 of the fixed tube 360, and has an outer diameter greater than an inner diameter of the thicker wall portion 390 and its distally-facing shoulder 495, thus forming a proximally-facing shoulder 496. The thicker wall portion 390 thus limits axial movement of the second rotatable element portion 420 (and thus the rotatable element 400) in the proximal direction relative to the fixed tube 360. The rotatable element 400 is, however, free to rotate relative to the fixed tube 360. A spring 498 is disposed to surround the second rotatable element portion 420 and bear against the shoulder 495 on one side and the shoulder 496 on the other side. The spring 498 thus provides a constant thrust on the larger diameter portion 460 from the thicker wall portion 390, which assists in operation of the expansion tool 355 as discussed in detail below.

At the proximal end of the first rotatable element portion 410 (and thus at the proximal end of the rotatable element 400) is provided a socket 465 configured to mate with a standard socket wrench, as illustrated in FIG. 9A, so that the rotatable element 400 can be rotated relative to the fixed tube 360 using such a standard socket wrench. At the distal end of the larger diameter portion 460 (and thus the distal end of the rotatable element 400) is a flat surface 485 on which is provided an axial protrusion 470, and a central axial bore 480 extending from the flat surface 485 and into the interior of the rotatable element 400. The central axial bore 480 is configured to receive a portion of the shank 130 of the shaft 20 that extends proximally of the first collar 30. As illustrated in FIGS. 8A-8C, the length of the proximally extending portion of the shank 130 will increase as the expansion plug 10 expands radially, and so the central bore 480 has a length sufficient to receive the proximally extending portion of the shank 130 in the FIG. 8C fully expanded state.

The axial protrusion 470 is radially offset from the central axis by a distance that matches a distance the cavity 190 of the first collar 30 is offset from the central axis, and is sized to firmly fit within and engage the cavity 190. Furthermore, the diameter and circumferential length of the circumferential slot 370 are sized so that, when the cavity 190 is mated to the axial protrusion 470, with the surfaces 170 and 485 in contact, and the set screw 240 set to protrude radially outward from the cylindrical outer surface 230, the set screw 240 and the radial outward protrusion 240 both engage the circumferential slot 370 at opposite sides thereof such that the second collar 40 has very limited movement relative to the fixed tube 360.

To install the expansion plug 10 to the expansion tool 355, the set screw 240 is set flush to outer surface 230, the radial outward protrusion 220 is slid through the axial slot 380 and rotated to one side of the circumferential slot 370, and then the set screw 240 rotated to extend radially outward and protrude into the circumferential slot 370. At the same time, the cavity 190 and the axial protrusion 470 are lined up to engage, such as by rotating the rotatable element 400 to the appropriate position. Further rotation of the rotatable element 400 in the advancement direction will then cause the first collar 30 to advance down the shank 130, since the fixing of the second collar 40 relative to the fixed tube 360, and the engagement of its radial inward protrusion 210 in the axial slot 150, will prevent the shaft 20 from rotating relative to the fixed tube 360, while the first collar 30 is, on the other hand, free to rotate relative to the fixed tube 360.

With the expansion plug 10 thus installed on the expansion tool 355, the expansion tool 355 can be operated using a standard socket wrench to cause the ears 70A and 70B of the second expansion structure to move apart, and then the first expansion structure/elastomeric element 50 to expand, as shown in FIGS. 8A-8C. This combination of expansion plug 10/expansion tool 355 can be useful in safely replacing a service tee, such as a tapping saddle, as discussed in detail below.

Figure 13:
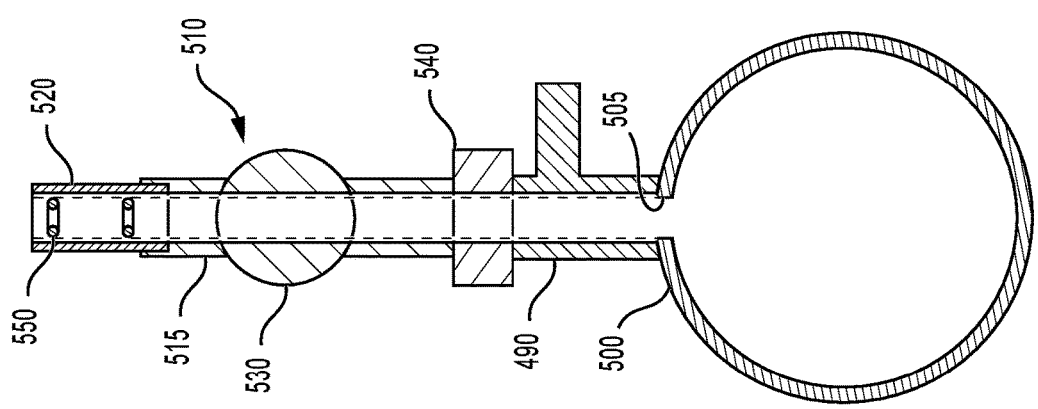
FIG. 13 illustrates a first step in a process using the expansion plug and expansion tool.

First, a closed-off service tee 490, which is connected to a gas main 500 at an opening 505, is connected with a valve tower 510, as shown in FIG. 13. This valve tower 510 includes a main pipe 515, a stuffing box 520, a rotatable closure valve 530, and an adapter 540. The stuffing box 520 is a pipe having one or more o-ring seals 550 in the passageway to seal against a cylindrical object (such as the above-described expansion tool 355) placed against the passageway. Furthermore, multiple stuffing boxes 520 of different sizes, each adapted to be threadedly attached to the main pipe 515, can be provided so that tools having different diameters, if needed, can be used.

The valve 530 is a rotary shut-off valve configured to be rotated, such as via a handle, to open or close the passageway in the main pipe 515. The adapter 540 has two internally threaded portions to threadedly connect to the main pipe 515 and the service tee 490. Adapters 540 of different sizes can be provided so that the main pipe 515 can be connected to service tees 490 of different sizes.

Figure 14:
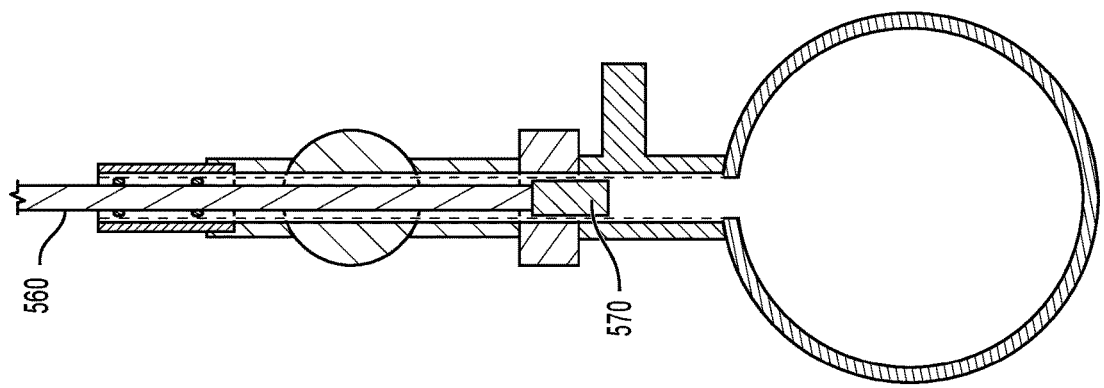
FIG. 14 illustrates a second step in a process using the expansion plug and expansion tool.

Next, as illustrated in FIG. 14, a cutter remover tool 560 is used to remove a cutter 570 of the service tee 490. The cutter remover tool 560 is designed to bore into the cutter and then unscrew the cutter 570 for removal. The cutter remover tool 560 seals with the seals 550 of the stuffing box 520 to prevent escape of gas from the gas main 500. Furthermore, for service tees in which removal of the cutter 570 allows for escape of gas, the valve 530 is closed when the distal end of the cutter remover tool 560 holding the cutter 570 is moved to above the valve 530 but before it is removed from the stuffing box 520.

Figure 15:
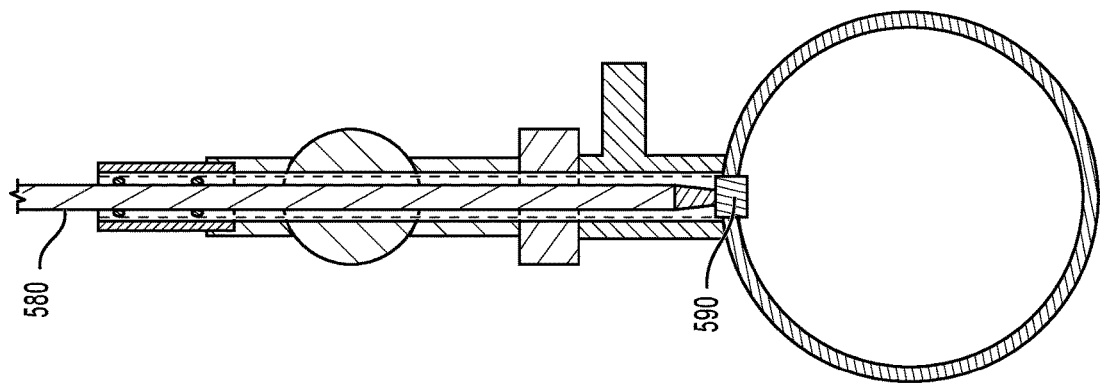
FIG. 15 illustrates a third step in a process using the expansion plug and expansion tool.

Then, as illustrated in FIG. 15, if the service tee 490 is of the type to have a seat ring 590, a seat ring remover tool 580 is used to remove the seat ring 590. The seat ring remover tool 580 is designed to bore into the seat ring 590 for removal. The seat ring remover tool 580 seals with the seals 550 of the stuffing box 520 to prevent escape of gas from the gas main 500. Furthermore, the valve 530 is closed when the distal end of the seat ring remover tool 580 holding the seat ring 590 is moved to above the valve 530 but before it is removed from the stuffing box 520.

At this point, an expansion plug 10 is attached to the distal end of the expansion tool 355 in the manner discussed above. The distal end of the expansion tool 355 having the expansion plug 10 is inserted through the stuffing box 520 but above the valve 530, such that the outer wall of the expansion tool 355 seals with the seals 550 to prevent the escape of gas, and the valve 530 is open. Next, the expansion tool 355 is lowered so that at least the second expanding structure of the expansion plug 10 is below the opening 505 in the main 500.

The expansion plug is then actuated according to the previously-described FIGS. 8A-8C. In particular, the second expanding structure is expanded by rotating the rotatable element 400 relative to the fixed tube 360, so that the ears 70A and 70B, at their furthest-apart respective points, are wider than the opening 505 in the gas main 500. The expansion tool 355 is then moved proximally until the ears 70A and 70B bear against the inner wall of the gas main 500. This positions the first expanding structure/elastomeric element 50 in the opening 505, in a position in which it can seal the transverse hole when expanded. The ears 70A and 70B and structure holding them in their expanded state (i.e., wedge 60) are made of a rigid material and have a size selected so that, when expanded, they cannot fit through the transverse hole. Accordingly, once the ears 70A and 70B are expanded, the plug cannot be ejected from the transverse hole by the pressure of the gas in the main. Note that during this rotation and the rotation in the next step discussed below, the constant thrust from the spring 498 will ensure that the axial protrusion 470 remains engaged to the cavity 190 of the expansion plug 10, and that the surfaces 170 and 485 remain in contact, even as the collar 30 advances relative to the shank 130.

The first expanding structure/elastomeric element 50 is then expanded, by further rotating the rotatable element 400 relative to the fixed tube 360, so that the first expanding structure/elastomeric element 50 plugs the opening 505 in the main 500, and also helps hold the expansion plug 10 and expansion tool 355 in place relative to the main 500, as illustrated in FIGS. 16A and 16B. The pressure of the gas in the main against the ears 70A and 70B further assists in holding the expansion plug 10 in place. The valve tower 510 and service tee 490 can then be removed, leaving the expansion plug 10 and expansion tool 355 in place relative to the main 500, as illustrated in FIG. 17. This is done by simply sliding the valve tower 510 and service tee 490 upward off of the expansion tool 355. Note that in the event the service tee 490 is of the tapping saddle type, it is removed by first unbolting the above-described top clamp half and bottom clamp half from each other.

To install a new service tee, the above steps are then essentially reversed, i.e., a new service tee 490 and the valve tower 510 are installed over top of the expansion tool 355, the expansion tool 355 is un-expanded and removed, a new cutter is installed, and the valve tower 510 is removed.

All of the components of the expansion plug and the expansion tool, except for the elastomeric element, can be made of a metal such as steel. The elastomeric element can be made of, for example, rubber.

The detailed description above describes embodiments of an expansion plug, and to a system and method for sealing a transverse hole in a pipe using the expansion plug. The invention is not limited, however, to the precise embodiments and variations described. Various changes, modifications and equivalents can be effected by one skilled in the art without departing from the spirit and scope of the invention as defined in the accompanying claims. It is expressly intended that all such changes, modifications and equivalents which fall within the scope of the claims are embraced by the claims.

What is claimed is:

1. An expansion plug, comprising:
   a shaft having a head on a distal end thereof and a shank, the head having an outer diameter larger than an outer diameter of the shank, the shank having a threaded outer surface;
   a first collar having a threaded hole engaged to the threaded outer surface of the shank and configured to move along the shank as the collar is rotated relative to the shank;
   a first expanding structure configured to expand upon opposite sides of the first expanding structure moving closer together, the first expanding structure disposed on the shank distal to the first collar; and
   a second expanding structure configured to expand upon opposite sides of the second expanding structure moving closer together, the second expanding structure disposed on the shank distal to the first expanding structure;
   wherein the expansion plug is configured such that, as the first collar is rotated in a direction to advance the first collar toward the head, the opposite sides of the second expanding structure are moved closer together to expand the second expanding structure, and then the opposite sides of the first expanding structure are moved closer together to expand the first expanding structure.

2. The expansion plug of claim 1, wherein the first collar includes a first major surface, a second major surface opposite the first major surface and facing the head of the shaft, and a cavity formed in the first major surface and configured to be engaged by an axial protrusion of an expansion tool.

3. The expansion plug of claim 2, further comprising a second collar having a radial inward protrusion engaged with an axial slot in the threaded outer surface of the shank to limit rotation of the second collar relative to the shank while allowing the second collar to move along the shank, the second collar disposed on the shank distal to the first collar and proximal to the first expanding structure.

4. The expansion plug of claim 3, wherein the second collar further comprises a radial outward protrusion configured to engage with a circumferential slot of the expansion tool.

5. The expansion plug of claim 3, further comprising a washer disposed on the shank between the second collar and the first expanding structure.

6. The expansion plug of claim 1, further comprising a second collar having a radial inward protrusion engaged with an axial slot in the threaded outer surface of the shank to limit rotation of the second collar relative to the shank while allowing the second collar to move along the shank, the second collar disposed on the shank distal to the first collar and proximal to the first expanding structure.

7. The expansion plug of claim 6, wherein the second collar further comprises a radial outward protrusion configured to engage with a circumferential slot of an expansion tool.

8. The expansion plug of claim 6, further comprising a washer disposed on the shank between the second collar and the first expanding structure.

9. The expansion plug of claim 1, further comprising a washer disposed on the shank between the first expanding structure and the second expanding structure.

10. The expansion plug of claim 1, further comprising a washer disposed on the shank between the second expanding structure and the head.

11. The expansion plug of claim 1, wherein the first expanding structure comprises an elastomeric element having an annular configuration and configured to expand radially when it is compressed axially.

12. The expansion plug of claim 11, wherein the second expanding structure comprises a wedge having a central opening disposed over the shank, a pair of opposed ears which surround the shank, and a circumferential spring which biases the ears together, wherein the ears are configured to be pushed apart radially as the wedge moves toward the head to press against angled walls of the ears in a direction opposing the bias of the circumferential spring.

13. The expansion plug of claim 1, wherein the second expanding structure comprises a wedge having a central opening disposed over the shank, a pair of opposed ears which surround the shank, and a circumferential spring which biases the ears together, wherein the ears are configured to be pushed apart radially as the wedge moves toward the head to press against angled walls of the ears in a direction opposing the bias of the circumferential spring.

14. A system for sealing a transverse hole in a pipe, comprising:
the expansion plug of claim 1; and
an expansion tool configured to rotate the first collar relative to the shank.

15. The system of claim 14, wherein the first collar includes a first major surface, a second major surface opposite the first major surface and facing the distal end of the shank, and a cavity formed in the first major surface and configured to be engaged by an axial protrusion of the expansion tool.

16. The system of claim 14, wherein the expansion plug further comprises a second collar having a radial inward protrusion engaged with an axial slot in the threaded outer surface of the shank to limit rotation of the second collar relative to the shank while allowing the second collar to move along the shank, the second collar disposed on the shank distal to the first collar and proximal to the first expanding structure.

17. The system of claim 16, wherein the second collar further comprises a radial outward protrusion configured to engage with a circumferential slot of the expansion tool.

18. A method for sealing a transverse hole in a pipe, comprising:
providing the expansion plug of claim 1; and
using an expansion tool to rotate the first collar relative to the shank in a first direction so that the expansion plug seals the transverse hole.

19. The method of claim 18, further comprising:
using the expansion tool to rotate the first collar relative to the shank in a second direction opposite the first direction so that the expansion plug no longer seals the transverse hole.

20. The method of claim 18, further comprising replacing a service tee operatively connected to the transverse hole while the expansion plug seals the transverse hole.

* * * * *